(12) United States Patent
Lee

(10) Patent No.: US 6,966,340 B2
(45) Date of Patent: Nov. 22, 2005

(54) SLIDE SPOOL VALVE

(75) Inventor: Yun Boon Lee, Seoul (KR)

(73) Assignee: Aser Tech Co., Ltd., Seoul (KR)

( * ) Notice: Subject to any disclaimer, the term of this patent is extended or adjusted under 35 U.S.C. 154(b) by 6 days.

(21) Appl. No.: 10/773,429

(22) Filed: Feb. 9, 2004

(65) Prior Publication Data

US 2005/0067031 A1    Mar. 31, 2005

(30) Foreign Application Priority Data

Sep. 29, 2003  (KR) ............... 10-2003-0067438
Dec. 19, 2003  (KR) ............... 10-2003-0093694

(51) Int. Cl.[7] ............................................. F15B 13/04

(52) U.S. Cl. .............................................. 137/625.69

(58) Field of Search ................................... 137/625.69

(56) References Cited

U.S. PATENT DOCUMENTS 6,834,676 B2 *  12/2004  Kulmann ............... 137/625.69
2003/0217776 A1 * 11/2003  Kulmann et al. ...... 137/625.27

FOREIGN PATENT DOCUMENTS

DE        197 45 802 A1 *  4/1999

* cited by examiner

*Primary Examiner*—Gerald A. Michalsky
(74) *Attorney, Agent, or Firm*—Leydig, Voit & Mayer, Ltd.

(57) ABSTRACT

A slide spool valve has a valve body formed by synthetic resin injection molding. The valve body includes a bore and an insert integrally coupled with the bore. The insert has a hollow portion penetrated by a port, the hollow portion being connected to the bore and having the same diameter as the bore and penetrated by one of ports. A valve room having a large diameter extends from an inner circumferential surface of the hollow portion to the penetrating portion of the port. The insert is manufactured by die casting and fixed in a metallic pattern of the valve body, so that it is integrally coupled with the valve body by insertion molding.

8 Claims, 3 Drawing Sheets

PRIOR ART

SLIDE SPOOL VALVE

This application claims the priority of Korean Patent Applications No. 2003-67438, filed on Sep. 29, 2003, and No. 2003-93694, filed on Dec. 19, 2003, in the Korean Intellectual Property Office, the disclosure of which is incorporated herein by reference in their entirety.

BACKGROUND OF THE INVENTION

1. Field of the Invention

The present invention relates to a slide spool valve, and more particularly, to a slide spool valve, a valve body of which has an improved structure formed using a metallic pattern in an injection molding process, which is advantageous for mass production.

2. Description of the Related Art

As is well known, a slide spool valve includes a valve spool inserted in a bore and changes the flow of compressed air or operating fluid as the valve spool reciprocates along an axial direction in the bore. Since the motion of the valve spool is minimally affected by the pressure of the compressed air or the operating fluid, air or fluid flow can be easily controlled using the slide spool valve. Thus, the slide spool valve has been widely used as a three or more-port connection directional control valve.

FIG. 1 illustrates a conventional slide spool valve, disclosed in U.S. Pat. No. 6,325,102, which is used as a main valve of a directional control valve. Referring to FIG. 1, a valve body 1 comprises a bore 2 and five ports, namely, a supply port P, two load ports A and B, and two exhaust ports R1 and R2. The five ports are spaced at predetermined intervals in an axial direction and each formed by penetrating an inner circumferential surface of the bore 2. A valve room 3 extends from the penetrating portion of each port, which is formed in the inner circumferential surface of the bore 2, and has a diameter larger than a diameter of the bore 2. A valve spool 4, which is inserted in the bore 2, has a plurality of valve portions 5 formed in a flange shape along the valve spool 4 in accordance with the number and spacing of the ports. Each of the valve portions 5 is encompassed by an elastic seal ring 6 to respectively seal the inner circumferential surface of the bore 2. In FIG. 1, reference numeral 7 denotes a bracket for connecting a fitting.

The valve spool 4 is operated by an actuator (not shown) to move in alternate directions in the bore 2. In a normal state, as shown in FIG. 1, the valve spool 4 is in its most right position. When the valve spool 4 is in the normal state, the exhaust port R1 is closed off, the supply port P is connected to the load port A, and the load port B is connected to the other exhaust port R2. When the valve spool 4 moves to the left, the load port A is connected to the exhaust port R1, the supply port P is connected to the load port B, and the exhaust port R2 is closed off.

The actuator for the valve spool 4 can be of various types, for example, a direct driven type using a solenoid and spring, an internal or external pilot operated type, or a solenoid controlled pilot operated valve according to the type of a valve.

The elastic seal rings 6, which respectively encompass the valve portions 5 of the valve spool 4, seal the inner circumferential surface of the bore 2. If the elastic seal ring 6 is damaged or worn out, the leakage of fluid may occur, causing a malfunction of the slide valve spool. The valve room 3 is required to prevent the elastic seal ring 6 from being damaged by the corner of the penetrating portion of each port connected to the inner circumferential surface of the bore 2. Without the valve room 3, the entire elastic seal ring 6 cannot be uniformly pressurized around the penetrating portion of each port and is loosened toward the penetrating portion of each port. Thus, the loosened portion of the elastic seal ring 6 may be caught by the corner of the penetrating portion and be damaged or detached.

In the slide spool valve, the valve room 3 is required to protect the elastic seal ring 6 from damage, but the structure of the valve room 3 makes it hard to form the valve body by synthetic resin injection molding. Also, the valve body 1 cannot be formed of iron, which erodes due to moisture or the like. Thus, a conventional slide spool valve comprises a valve body manufactured by aluminum die casting.

As described above, a valve body of a conventional slide spool valve is manufactured by aluminum die casting and a valve room in a bore is secondarily processed so that the manufacture thereof is difficult and the cost is high.

SUMMARY OF THE INVENTION

The present invention provides a slide spool valve having a valve body formed by synthetic resin injection molding, which is advantageous for mass production. The cost of the valve body decreases, and the slide spool valve is simply manufactured without complicated post-processes. Accordingly, the productivity greatly improves.

According to an aspect of the present invention, there is provided a slide spool valve, comprising a valve body, one or more insertion materials, and a valve spool. The valve body has a bore penetrated by a plurality of ports spaced at predetermined intervals. Each of the insertion materials includes a hollow portion and a valve room. The hollow portion is inserted in and attached to the bore, and the valve room extends from an inner circumference surface of the hollow portion to at least one port of the plurality of ports penetrating the hollow portion. The valve spool is movably inserted in the bore and the hollow portion of the insertion material attached thereto and selectively connects or disconnects the plurality of ports according to an operation of the slide spool valve.

The insertion material can comprise a film having a processed surface. The film can reinforce the coupling of the insertion material with the valve body.

The insertion material can be made by aluminum die casting, and the film can be formed by anodizing the surface of the insertion material after the aluminum die casting.

BRIEF DESCRIPTION OF THE DRAWINGS

The above object and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
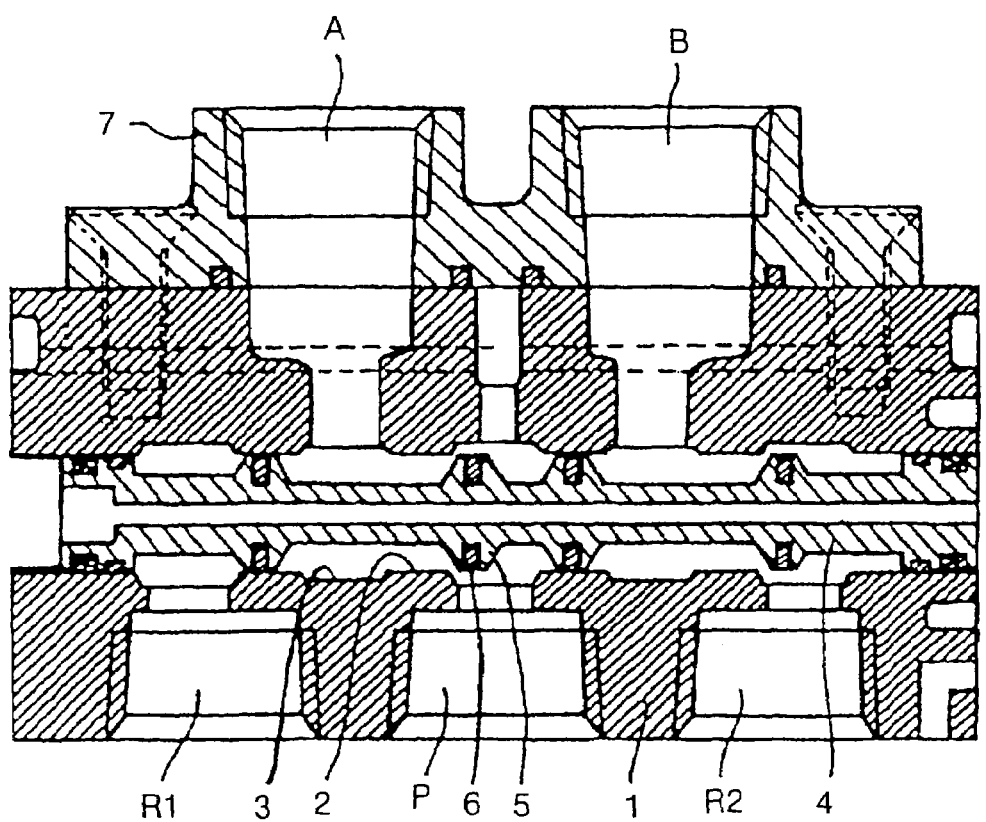
FIG. 1 is a sectional view of a conventional slide spool valve.
Figure 2:
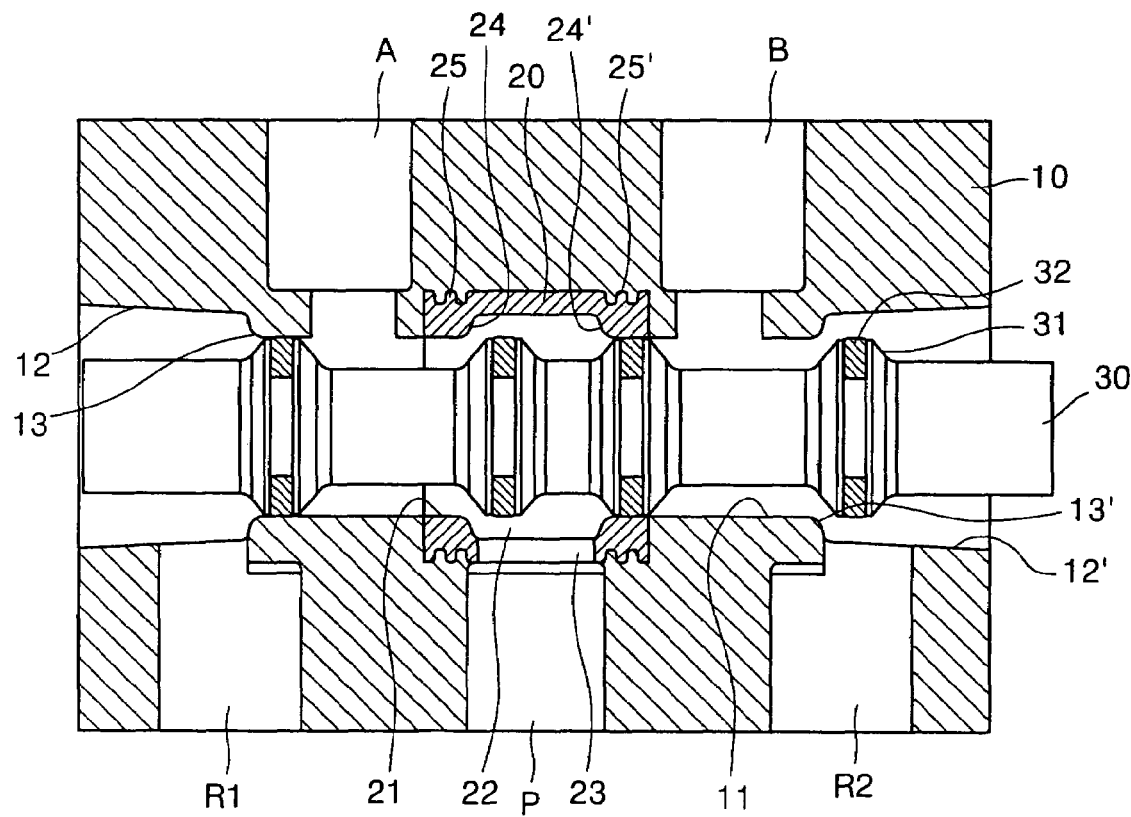
FIG. 2 is a sectional view of a slide spool valve according to an embodiment of the present invention.

FIG. 2 is a sectional view of a slide spool valve according to an embodiment of the present invention. The slide spool valve is a pneumatic five-port connection valve. In FIG. 2, reference numeral 10 denotes a valve body, 20 denotes an insertion material, and 30 denotes a valve spool. The valve body 10 is formed of a synthetic resin for injection molding.

The insertion material 20 is fixed in a metallic pattern of the valve body 10, so that it is integrally coupled with the valve body 10 by an insertion molding method. The insertion material 20 is formed by aluminium die casting or using other metallic pattern for synthetic resin injection molding.

The valve body 10 has a bore 11, and the insertion material 20 has a hollow portion 21 of same diameter as the bore 11. The bore 11 of the valve body 10 is penetrated by five ports, namely, a supply port P, two load ports A and B, and two exhaust ports R1 and R2, which are spaced at predetermined intervals in an axial direction. The ports other than the supply port P are directly connected to the bore 11, and the supply port P is connected to the hollow portion 21 of the insertion material 20. Valve rooms 12 and 12' are formed at both ends of the bore 11 of the valve body 10 and have a taper shape having a large diameter outward. The exhaust ports R1 and R2 are connected to the valve rooms 12 and 12', respectively. Stepped corners 13 and 13' at interfaces between an inner circumferential surface of the bore 11 and the valve rooms 12 and 12' respectively have round surfaces. The taper valve rooms 12 and 12' make it easy to detach the valve body 10 from the metallic pattern after injection molding and provide optimum conditions to reduce the number of valve members of a valve spool. The round stepped corners 13 and 13' effectively prevents damage of elastic seal rings which encompass valve portions of the valve spool.

A valve room 23 having a large diameter extends from an inner circumferential surface of the hollow portion 21 of the insertion material 20 toward the supply port P. A connection hole 22 is formed to connect the valve room 23 and the supply port P. Stepped corners 24 and 24' at interfaces between the inner circumferential surface of the hollow portion 21 and the valve room 23 have round surfaces in order to prevent damage of elastic seal rings to be described later.

Rough portions 25 and 25' are formed in at least a part of an outer surface of the insertion material 20 and reinforce the coupling of the valve body 10 with the insertion material 20.

The valve spool 30 comprises a plurality of valve portions 31 which have a flange shape around an axis. Each of the valve portions 31 is encompassed by an elastic seal ring 32 to seal, for example, the inner circumferential surface of the bore 11 and the inner circumferential surface of the hollow portion 21 of the insertion material 20. In the present embodiment, the valve spool 30 comprises four valve portions 31. Two of them move along the inner circumferential surface of the hollow portion 21 of the insertion material 20 and alternately open or close off the load ports A and B. The other two of the valve portions 31 move along the inner circumferential surface of the bore 11 of the valve body 10 and alternately open or close off a path between one load port A and one exhaust port R1 and a path between the other load port B and the other exhaust port R2.

In the present embodiment, the valve spool 30 is operated by an actuator, well-known in the art, and moves to the left or right. In FIG. 2, the valve spool 30 is shown in a normal state in which the spool 30 is in its most right position. In the normal state, the exhaust port R1 is closed off, the supply port P is connected to the load port A, and the load port B is connected to the exhaust port R2. When the valve spool 30 moves to the left, the exhaust port A is connected to the exhaust port R1, the supply port P is connected to the load port B, and the exhaust port R2 is closed off.

Figure 3:
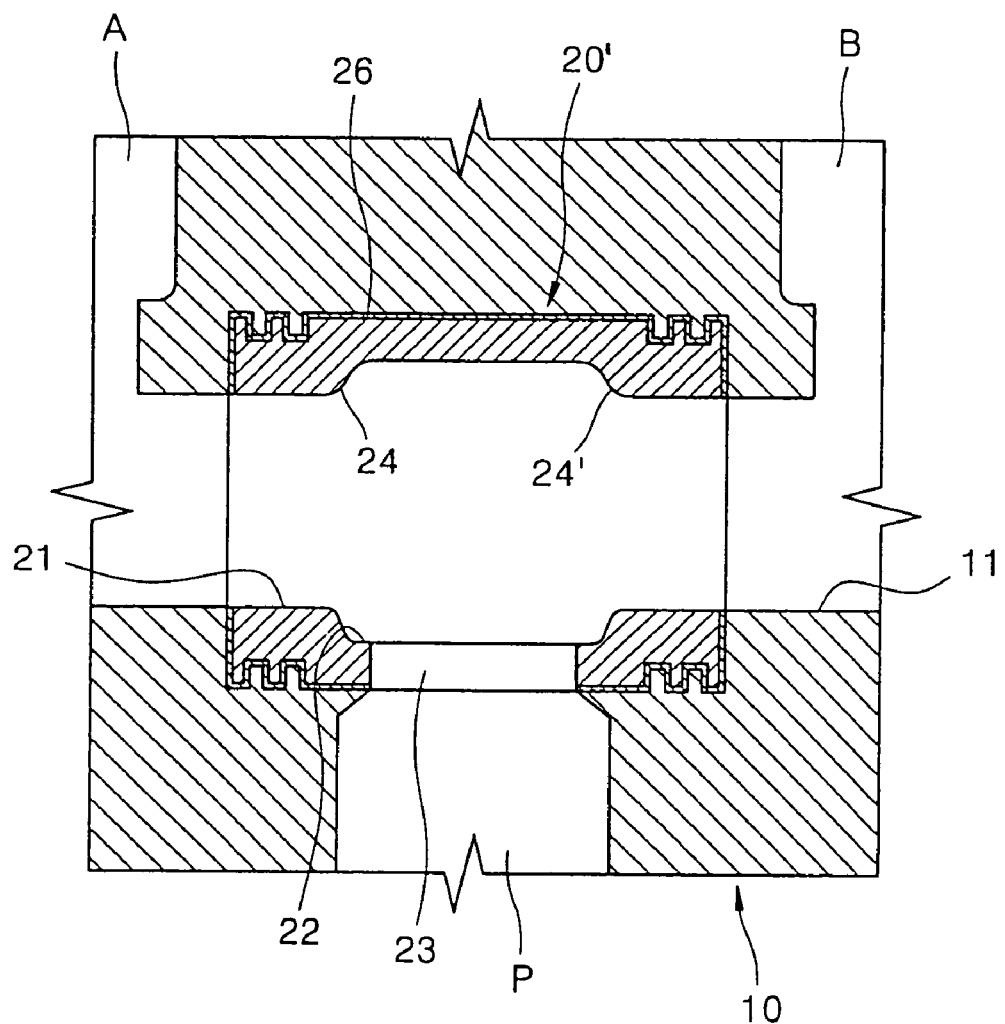
FIG. 3 is a sectional view of a main portion of a slide spool valve according to another embodiment of the present invention.

FIG. 3 is a sectional view of a main portion of a valve body of a slide spool valve according to another embodiment of the present invention. In the slide spool valve of the present embodiment, the valve body 10 comprises an insertion material 20' having an anodized surface. That is, the insertion material 20' is made by aluminum die casting and has a film 26 that is formed by anodizing the surface of the insertion material 20' after the aluminum die casting. The film 26 reinforces the intensity of the insertion material 20', the coupling of the valve body 10 with the insertion material 20', and a sealing state. That is, the film 26 prevents fluid from flowing between the valve body 10 and the insertion material 20'. The anodization is performed by a known method considering a material and required intensity of the valve body 10.

The above embodiments are not limited to only a pneumatic five-port connection two position valve, but various valves having less or more ports than five can be used. Also, a valve body can comprise two or more insertion materials, or two or more ports can be connected to an insertion material according to the design of a valve. Further, the present invention can be applied to a hydraulic valve.

As described above, a slide spool valve of the present invention comprises a valve body to which an insertion material is integrally coupled by an insertion molding method. The valve body is made by synthetic resin injection molding using a low-cost and simple manufacturing process, thereby being advantageous for mass production. After the insertion material is molded by die casting, a valve room within a hollow portion of the insertion material should be post-processed. However, the amount of consumed material is small, and the manufacturing process is simple since the hollow portion and the valve room are not very deep. As it is also possible to mold the insertion material by additional synthetic resin injection molding, the cost can be further reduced. Therefore, the present invention can greatly reduce the production cost of the slide spool valve.

Further, in the slide spool valve of the present invention, the number of valve members of a valve spool can be reduced from 6~8 to 4, and the damage to an elastic seal ring of the valve spool can be minimized. Consequently, the present invention increases the life span and performance of the slide spool valve.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. A slide spool valve comprising:
   a valve body having a bore penetrated by a plurality of ports spaced at predetermined intervals, including a supply port, two load ports located on opposite sides of the supply port, and two exhaust ports located on opposite sides of the load ports, and tapered valve chambers at each end of the bore which are penetrated by a respective exhaust port, the tapered valve chambers each having a smallest diameter which is larger than a diameter of the bore and an outer end diameter which is larger than the smallest diameter;
   an insert including a hollow portion inserted in and attached to the bore, and a valve chamber which extends from an inner circumferential surface of the hollow portion to the supply port and is connected to the supply port; and
   a valve spool, movably inserted in the bore and the hollow portion of the insert, and selectively connecting and disconnecting the plurality of ports according to operation of the slide spool valve.

2. The slide spool valve of claim 1, further comprising stepped corners at interfaces between an inner circumferential surface of the bore of the valve body and the taper valve chambers, the stepped corners having rounded surfaces.

3. The slide spool valve of claim 1, further comprising stepped corners at interfaces between an inner circumferential surface of the hollow portion and the valve chamber of the insert, the stepped corners having rounded surfaces.

4. The slide spool valve of claim 1, further comprising roughened portions on at least a part of an outer surface of the insert, the roughened portions reinforcing coupling of the insert to the valve body.

5. The slide spool valve of claim 4 wherein the insert includes a film having a processed surface, the film reinforcing coupling of the insert to the valve body.

6. The slide spool valve of claim 5, comprising an aluminum die cast insert, wherein the film is an anodized surface of the die cast aluminum insert.

7. The slide spool valve of claim 1 wherein the insert includes a film having a processed surface, the film reinforcing coupling of the insert to the valve body.

8. The slide spool valve of claim 7, comprising an aluminum die cast insert, wherein the film is an anodized surface of the die cast aluminum insert.

* * * * *